US007212660B2

(12) United States Patent
Wetzel et al.

(10) Patent No.: US 7,212,660 B2
(45) Date of Patent: May 1, 2007

(54) SYSTEM AND METHOD FOR FINDING REGIONS OF INTEREST FOR MICROSCOPIC DIGITAL MONTAGE IMAGING

(75) Inventors: Arthur W. Wetzel, Murrysville, PA (US); John R. Gilbertson, II, Pittsburgh, PA (US); Jeffrey A. Beckstead, Valencia, PA (US); Patricia A. Feineigle, Pittsburgh, PA (US); Christopher R. Hauser, Pittsburgh, PA (US); Frank A. Palmieri, Jr., Gibsonia, PA (US)

(73) Assignee: Clarient, Inc., Aliso Viejo, CA (US)

( * ) Notice: Subject to any disclaimer, the term of this patent is extended or adjusted under 35 U.S.C. 154(b) by 0 days.

(21) Appl. No.: 11/258,803

(22) Filed: Oct. 26, 2005

(65) Prior Publication Data

US 2006/0045320 A1    Mar. 2, 2006

Related U.S. Application Data

(63) Continuation of application No. 09/758,037, filed on Jan. 11, 2001, now Pat. No. 6,993,169.

(51) Int. Cl.
*G06K 9/00* (2006.01)
(52) U.S. Cl. .................. 382/128; 382/255; 600/410
(58) Field of Classification Search ......... 382/13–133, 382/168, 203, 224, 225, 263, 270, 274, 282, 382/299, 321, 254, 255; 348/79; 435/5; 377/10; 600/476, 442, 410
See application file for complete search history.

(56) References Cited

U.S. PATENT DOCUMENTS 3,999,047 A    12/1976  Green

| 4,136,950 A | | 1/1979 | Labrum et al. |
|---|---|---|---|
| 4,150,360 A | * | 4/1979 | Kopp et al. .................. 382/133 |
| 4,199,748 A | | 4/1980 | Bacus |
| 4,213,036 A | | 7/1980 | Kopp et al. |
| 4,523,278 A | | 6/1985 | Reinhardt et al. |
| 4,742,558 A | | 5/1988 | Ishibashi et al. |
| 4,779,151 A | | 10/1988 | Lind et al. |
| 4,965,725 A | | 10/1990 | Rutenberg |
| 5,068,906 A | | 11/1991 | Kosaka |
| 5,072,382 A | | 12/1991 | Kamentsky |
| 5,073,857 A | | 12/1991 | Peters et al. |
| 5,099,521 A | | 3/1992 | Kosaka |
| 5,107,422 A | | 4/1992 | Kamentsky et al. |
| 5,123,056 A | | 6/1992 | Wilson |

(Continued)

FOREIGN PATENT DOCUMENTS

DE        3922358 A1    1/1991

(Continued)

OTHER PUBLICATIONS

Gaddipati et al., "An Efficient Method for Automated Segmentation of Histochemically Stained Slides", IEEE-EMBC and CMBEC (1995).

(Continued)

*Primary Examiner*—Kanjibhai Patel
*Assistant Examiner*—Seyed Azarian
(74) *Attorney, Agent, or Firm*—Fish & Richardson P.C.

(57) ABSTRACT

Imaging apparatuses and methods that capture a low-resolution image of a slide, identify a region of interest, and capture a high-resolution image of the region of interest.

33 Claims, 4 Drawing Sheets

U.S. PATENT DOCUMENTS

| | | | |
|---|---|---|---|
| 5,143,193 | A | 9/1992 | Geraci |
| 5,149,972 | A | 9/1992 | Fay et al. |
| 5,163,095 | A | 11/1992 | Kosaka |
| 5,216,500 | A | 6/1993 | Krummey et al. |
| 5,216,596 | A * | 6/1993 | Weinstein .................... 348/79 |
| 5,218,645 | A | 6/1993 | Bacus |
| 5,252,487 | A | 10/1993 | Bacus et al. |
| 5,257,182 | A | 10/1993 | Luck et al. |
| 5,260,871 | A | 11/1993 | Goldberg |
| 5,268,966 | A | 12/1993 | Kasdan |
| 5,287,272 | A * | 2/1994 | Rutenberg et al. .......... 382/224 |
| 5,297,034 | A | 3/1994 | Weinstein |
| 5,313,532 | A | 5/1994 | Harvey et al. |
| 5,333,207 | A | 7/1994 | Rutenberg |
| 5,363,258 | A | 11/1994 | Coles et al. |
| 5,381,224 | A | 1/1995 | Dixon et al. |
| 5,417,215 | A * | 5/1995 | Evans et al. ................ 600/442 |
| 5,428,690 | A * | 6/1995 | Bacus et al. ................ 382/128 |
| 5,471,561 | A | 11/1995 | Cowgill et al. |
| 5,473,706 | A | 12/1995 | Bacus et al. |
| 5,499,097 | A | 3/1996 | Ortyn et al. |
| 5,505,946 | A | 4/1996 | Kennedy et al. |
| 5,544,650 | A | 8/1996 | Boon et al. |
| 5,544,996 | A | 8/1996 | Castaldi et al. |
| 5,625,765 | A | 4/1997 | Ellenby et al. |
| 5,636,425 | A | 6/1997 | Best |
| 5,638,459 | A | 6/1997 | Rosenlof et al. |
| 5,647,025 | A | 7/1997 | Frost et al. |
| 5,680,694 | A | 10/1997 | Best |
| 5,687,251 | A | 11/1997 | Erler et al. |
| 5,700,125 | A | 12/1997 | Falace et al. |
| 5,740,270 | A | 4/1998 | Rutenberg et al. |
| 5,768,125 | A | 6/1998 | Zinger et al. |
| 5,784,162 | A | 7/1998 | Cabib et al. |
| 5,796,861 | A | 8/1998 | Vogt et al. |
| 5,835,620 | A | 11/1998 | Kaplan et al. |
| 5,838,837 | A | 11/1998 | Hirosawa et al. |
| 5,848,177 | A | 12/1998 | Bauer et al. |
| 5,878,152 | A | 3/1999 | Sussman |
| 5,912,699 | A | 6/1999 | Hayenga et al. |
| 5,933,519 | A | 8/1999 | Lee et al. |
| 6,014,451 | A | 1/2000 | Berry et al. |
| 6,031,930 | A | 2/2000 | Bacus et al. |
| 6,049,421 | A | 4/2000 | Raz et al. |
| 6,081,612 | A | 6/2000 | Gutkowicz-Krusin et al. |
| 6,091,842 | A | 7/2000 | Domanik et al. |
| 6,101,265 | A | 8/2000 | Bacus et al. |
| 6,151,405 | A * | 11/2000 | Douglass et al. ........... 382/133 |
| 6,172,349 | B1 | 1/2001 | Katz et al. |
| 6,226,392 | B1 | 5/2001 | Bacus et al. |
| 6,233,480 | B1 * | 5/2001 | Hochman et al. ........... 600/476 |
| 6,272,235 | B1 * | 8/2001 | Bacus et al. ................. 382/133 |
| 6,498,006 | B2 | 12/2002 | Wong |
| 6,545,265 | B1 | 4/2003 | Czarnetzki et al. |
| 6,711,283 | B1 | 3/2004 | Soenksen |
| 6,920,239 | B2 * | 7/2005 | Douglass et al. ........... 382/128 |

FOREIGN PATENT DOCUMENTS

| | | |
|---|---|---|
| DE | 199 23 821 A1 | 11/2000 |
| EP | 0 557 558 A1 | 9/1993 |
| GB | 1 404 628 | 9/1975 |
| JP | 11097342 | 4/1999 |
| WO | WO 92/13308 | 8/1992 |
| WO | WO 93/14594 | 8/1993 |
| WO | WO 97/04347 | 2/1997 |
| WO | WO 97/20198 | 6/1997 |
| WO | WO 98/39728 | 9/1998 |
| WO | WO 01/37192 | 5/2001 |
| WO | WO 01/61626 | 8/2001 |

OTHER PUBLICATIONS

Wang et al. "Automatic Threshold Selection Using Histogram Quantization", Journal of BioMedical Optics, vol. 2, No. 2 (Apr. 1997).

Borga et al., "FSED-Feature Selective Edge Detection", (2000).

Illumea Product Group Internet Page <http://www.illumea.com/800-823-3203/products/>.

Boone et al., "Biomarkers of Premalignant Breast Disease and Their Use as Surrogate Endpoints in Clinical Trials of Chemoprenventive Agents", The Breast Journal, vol. 1, No. 4 (1995).

Kelloff et al., "Development of Breast Cancer Chemopreventive Drugs", Journal of Cellular Biochemistry, 17G:2-13 (1993).

Boone et al. "Developments of Surrogate Endpoint Biomarkers for Clinical Trials of Cancer Chemopreventive Agents:Relationships to Fundamental Properties of Preinvasive (Intraepithelial) Neoplasia", Journal of Cellular Biochemistry, Supplement 19:10-22 (1994).

Pressman, Norman J., "Markovian Analysis of Cervical Cell Images", The Journal of Histochemistry and Cytochemistry, vol. 24, No. 1, pp. 138-144 (1976).

Bacus et al."Quantiation of Preinvasive Neoplastic Progression in Animal Models of Chemical Carcinogenesis", Journal of Cellular Biochemistry Supplements 28/29:21-38 (1997).

Dawson et al. "Analytical and Quantitative Cycology and Hiscology", Chromatin Texture Measurement by Markovian Analysis.

Russ, John C. "The Image Processing Handbook", 2nd edition.

Dance et al. "Segmenation of Mammograms Using Multiple Linked Self-Organizaing Neural Networks", Med. Phys. 22(2) (Feb. 1995).

Zhang et al. "Hough Spectrum and Geometric Texture Feature Analysis".

Bacus, James W. "Cervical Celll Recognition and Morphometric Grading by Image Analysis", Journal of Cellular Biochemistry, Supplement 23:33-42(1995).

Pereira et al. "Detection and Characterization of Microcalcification in Mammographic Images".

Weaver B A et al, "Performance of the Ultraheavy Collector of the Trex Experiment" Nuclear Instruments & Methods in Physics Research Section B, Nov. 1998, pp. 409-428, vol. 145, No. 3, Notho-Holland Publishing Company Amsterdam, NL.

* cited by examiner

SYSTEM AND METHOD FOR FINDING REGIONS OF INTEREST FOR MICROSCOPIC DIGITAL MONTAGE IMAGING

CROSS REFERENCE TO RELATED APPLICATIONS

This application is a continuation of U.S. patent application SER. No. 09/758,037, filed Jan. 11, 2001 now U.S. Pat. No. 6,993,169, which is incorporated herein by reference.

FIELD OF THE INVENTION

The present invention relates to microscopic digital imaging of complete tissue sections for medical and research use. In particular it describes a method to find regions of interest for high throughput montage imaging of microscope slides using a standard microscope and cameras.

BACKGROUND OF THE INVENTION

Laboratories in many biomedical specialties, such as anatomic pathology, hematology, and microbiology, examine tissue under a microscope for the presence and the nature of disease. In recent years, these laboratories have shown a growing interest in microscopic digital imaging as an adjunct to direct visual examination. Digital imaging has a number of advantages including the ability to document disease, share findings, collaborate (as in telemedicine), and analyze morphologic findings by computer. Though numerous studies have shown that digital image quality is acceptable for most clinical and research use, some aspects of microscopic digital imaging are limited in application.

Perhaps the most important limitation to microscopic digital imaging is a "subsampling" problem encountered in all single frame images. The sub-sampling problem has two components: a field of view problem and a resolution-based problem. The field of view problem occurs when an investigator looking at a single frame cannot determine what lies outside the view of an image on a slide. The resolution-based problem occurs when the investigator looking at an image is limited to the resolution of the image. The investigator cannot "zoom in" for a closer examination or "zoom out" for a bird's eye view. Significantly, the field of view and resolution-based problems are inversely related. Thus, as one increases magnification to improve resolution, one decreases the field of view. For example, as a general rule, increasing magnification by a factor of two decreases the field of view by a factor of four.

To get around the limitations of single frame imaging, developers have looked at two general options. The first option takes the general form of "dynamic-robotic" imaging, in which a video camera on the microscope transmits close to real time images to the investigator looking at a monitor, while the investigator operates the microscope by remote control. Though such systems have been used successfully for telepathology, they do not lend themselves to documentation, collaboration, or computer based analysis.

The second option being investigated to overcome the limitations inherit in single frame imaging is a montage (or "virtual slide") approach. In this method, a robotic microscope systematically scans the entire slide, taking an image at every field. The individual images are then "knitted" together in a software application to form a very large data set with very appealing properties. The robotic microscope can span the entire slide area at a resolution limited only by the power of the optical system and camera. Software exists to display this data set at any resolution on a computer screen, allowing the user to zoom in, zoom out, and pan around the data set as if using a physical microscope. The data set can be stored for documentation, shared over the Internet, or analyzed by computer programs.

The "virtual slide" option has some limitations, however. One of the limitations is file size. For an average tissue section, the data generated at 0.33 um/pixel can be between two and five gigabytes uncompressed. In an extreme case, the data generated from one slide can be up to thirty-six gigabytes.

A much more difficult limitation with the prior systems is an image capture time problem. Given an optical primary magnification of twenty and a two-third inch CCD, the system field of view is approximately (8.8 mm.times.6.6 mm)/20=0.44.times.0.33 mm. A standard microscope slide typically has a specimen area of 25 mm.times.50 mm or 12.5 square centimeters. This requires over eighty-six hundred fields to image this entire specimen region. However, the average tissue section for anatomic pathology is approximately 2.25 square centimeters. This only requires approximately fifteen hundred fields to cover the tissue alone, approximately 80 percent less fields.

Traditionally, field rate in montage systems is limited by three factors —camera frame rate, image processing speed, and the rate of slide motion between fields. Given today's technology, the limiting factor can be reduced to only the camera frame rate. Using a 10 frame per second camera for the example above, imaging the entire slide would require 860 seconds or 14.33 minutes. If only the region of interest was imaged, this average time could be reduced to 150 seconds or 2.5 minutes; substantially increasing the slide throughput of an imaging system.

Thus, a system is needed to automatically find the region of interest on a microscope slide and image only this region.

SUMMARY OF THE INVENTION

Embodiments of imaging methods disclosed herein include capturing one or more low-resolution digital images of a slide, identifying at least one region of interest from the low-resolution digital image, and capturing one or more high-resolution images of the regions of interest. Embodiments of imaging apparatuses disclosed herein include components to perform those acts.

The present invention relates to a method and system for processing a thumbnail image from a microscope slide to determine tissue locations on the slide. The system comprises an image cropping component, a tissue finding component, and a scan control component. The image cropping component crops the thumbnail image and removes portions of the image that fall outside of determined slide boundaries. The cropped image from the image cropping component is inputted into the tissue finding component. The tissue finding component identifies tissue regions by applying a sequence of filters that incorporate knowledge of typical appearance and location of tissue and non-tissue slide regions. The tissue finding component outputs a tiling matrix whose values indicate which tiles should be imaged. The scan control component interprets the tiling matrix and transposes positions of the tiling matrix into actual stage coordinate for a microscopic imaging.

Accordingly, it is an object of the invention to provide a microscopic imaging system for whole slide montage in which standard microscope optics, off the shelf cameras and a simple motorized stage can be used to select the region of interest, image only this section and produce perfectly aligned image tiles.

The present invention uses a pre-scan process applied to a macroscopic image of the entire slide, to guide a high-resolution slide scanning process and ensure high-quality images of the entire specimen are acquired. The pre-scan process includes an image cropping component, a tissue-finding component, and a scan control component. The image cropping and tissue finding components identify interesting regions on the slide to be scanned. The scan control component generates the control parameters for a motorized microscopic imaging system.

It is another object of the invention to use a high-resolution slide scanning process to control the operation of the motorized stage and camera. This process utilizes information gathered by the pre-scan process, namely the imaging regions, to control the positioning of the stage to image only the regions of interest and to ensure the individual images are well aligned.

Additional features and advantages of the invention will be set forth in the description that follows, and in part will be apparent from the description, or may be learned by practice of the invention. The objectives and advantages of the invention to be realized and attained by the microscopic image capture system will be pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

DESCRIPTION OF THE PREFERRED EMBODIMENTS

Reference will now be made in detail to the preferred embodiments of the present invention, examples of which are illustrated in the accompanying drawings. The following paragraphs describe the functionality of the inventive system and method for high throughput montage imaging of microscope slides using a standard microscope and cameras.

Figure 1:
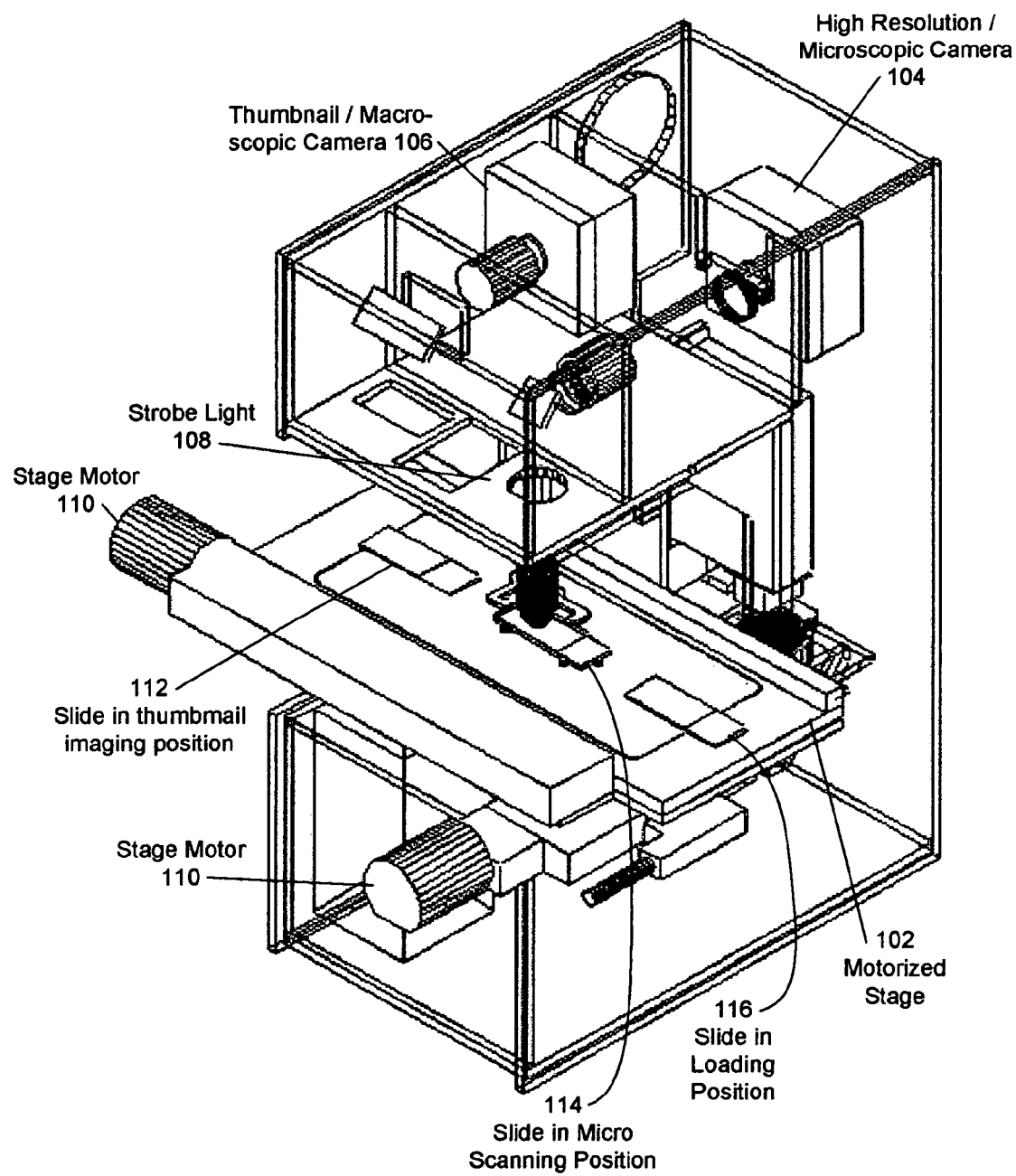
FIG. 1 illustrates an isometric view of the system in an preferred embodiment.

FIG. 1 illustrates a preferred embodiment of the invention. In this embodiment, a slide 112 to be imaged is placed on a thumbnail imaging position in a slide holder on a motorized stage 102. A single frame image containing the entire slide is taken with a macro camera 106. This low-resolution image is analyzed by software components to determine the locations of tissue on slide 112. This information can then be used to generate control parameters for stage 102 and microscopic camera 104 to ensure that the scanning process captures high quality images of only the tissue regions, substantially reducing the time to scan an average slide.

As is obvious to one skilled in the art, although capturing the single macroscopic image saves time, it is not necessary for the operation of the invention. Multiple macroscopic images may be required to generate control parameters to the accuracy required based on the ratio of the macroscopic to microscopic magnifications and the camera specifications of each camera, if separate cameras are utilized.

Specifically in a preferred embodiment, a pre-scan processing of the low-resolution or thumbnail image includes an image cropping component, a tissue-finding component and a scan control component. The image cropping component and tissue finding component identify tissue regions on the slide to be scanned. The scan control component generates the necessary control parameters to scan only the regions of interest under the microscopic optics.

The first step in processing the thumbnail image consists of flat-field correcting the macroscopic thumbnail image using a similar image obtained from the same camera and a blank slide. This removes any spatial light anomalies from the thumbnail image, which may reduce the efficiency of the tissue-finding component. Given the format, or size, of the camera and the aspect ratio of the slide, a portion of the image will contain non-slide objects such as the slide carrier. To remove these features, the thumbnail image is cropped to extract only the slide information.

The image cropping is accomplished via a two-pass process. The first pass determines an approximate location of the slide boundary, and the second pass fine-tunes this estimate. The search for the boundary is conducted over upper and lower intervals corresponding to the regions expected to contain the upper and lower slide edges, respectively. For this discussion, the slide or region of interest is assumed to be positioned near the center, vertically, in the thumbnail image. To facilitate this and subsequent processing steps, a copy of the thumbnail image is converted to grayscale. The portion of the image falling outside of the identified slide boundary is removed. It should be noted that the original color image is also cropped at the estimated edge locations, and then is uniformly reduced in size to produce a small thumbnail image of the slide for rapid, visual slide identification.

Since the slide may not be oriented perfectly horizontal in the original thumbnail image, the identified slide edges are likely to lie at an angle. Thus, even after cropping, there may be remnants of the slide edges or cover slip in the cropped image. Therefore, the image-cropping component attempts to identify pixel blocks that likely contain these remaining edges and flags these blocks as edges that will not be considered for high resolution imaging by the tissue finding component.

The resulting cropped grayscale image generated by the image-cropping component serves as input to the tissue finding component. This component locates regions in the thumbnail image that contain tissue of interest to a specialist. In order to minimize the time and storage space required to accomplish high-resolution slide imaging, the inventive system captures only those regions of the slide that contain tissue. This approach requires that regions containing tissue be identified in the thumbnail image.

The tissue finding component identifies tissue regions via a sequence of filters that incorporate knowledge of the typical appearance and location of tissue and non-tissue slide regions. Initial filtering steps analyze the mean and standard deviation of the local pixel intensities. Pixel mean intensities are used to differentiate tissue-containing regions from blank and other non-tissue regions, such as those containing the slide label or other markings. The standard deviation data represents the amount of variation in pixel values and thus is a good indicator of the border between tissue and the blank slide. The mean and standard deviation data is combined to generate a threshold value that is used to make an initial classification of tissue versus non-tissue. Subsequently, morphological filters are applied to refine the classification based on the size and position of neighboring groups of potential tissue pixels.

The filters which comprise the tissue finding component process the pixels of the cropped grayscale thumbnail image in groups that correspond to slide regions, or tiles, that can be imaged individually during the high-resolution scanning process. These filters ensure that tiles only partially filled with tissue are classified as tissue-containing tiles. The final output of the filter sequence is a tiling matrix whose values indicate which tiles should be imaged; the tiling matrix subsequently guides the high-resolution scanning process.

The above description was based on using the mean and standard deviation of the local pixels as the basis for detecting regions of interest. It is obvious to one skilled in the art that other image characteristics can be also used to identify the specimen from non-items of interest such as dust and scratches.

This description was also based on processing a gray scale macroscopic image, the same processing tools can be applied to each of the color components (traditionally, red, green and blue) of a color image. Additional processing tools can also be applied between the color components to refine the tissue finding accuracy and to remove features such as labels and writing that are not critical to the application.

Figure 2:
FIG. 2 represents sample results of the macroscopic image after the cropping component has been applied to remove non-slide regions.
Figure 3:
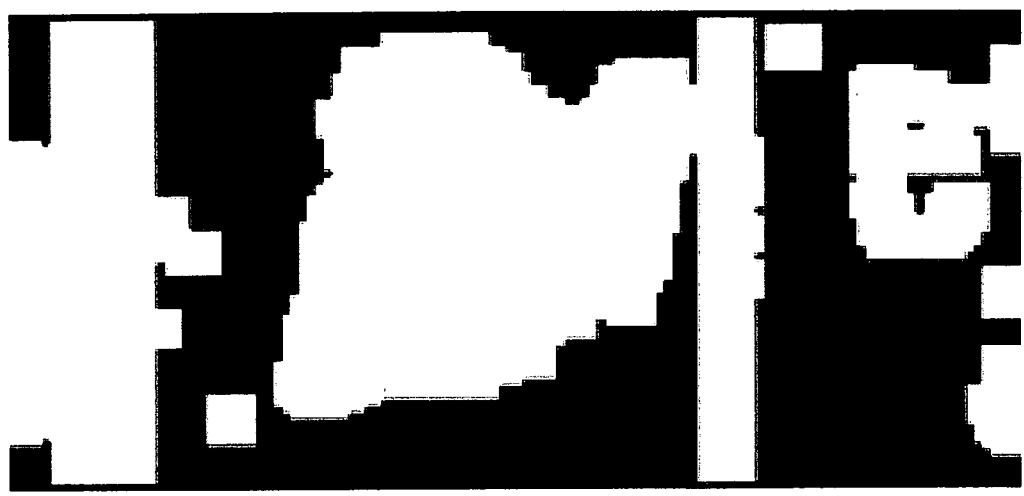
FIG. 3 represents the results of the find tissue component.
Figure 4:
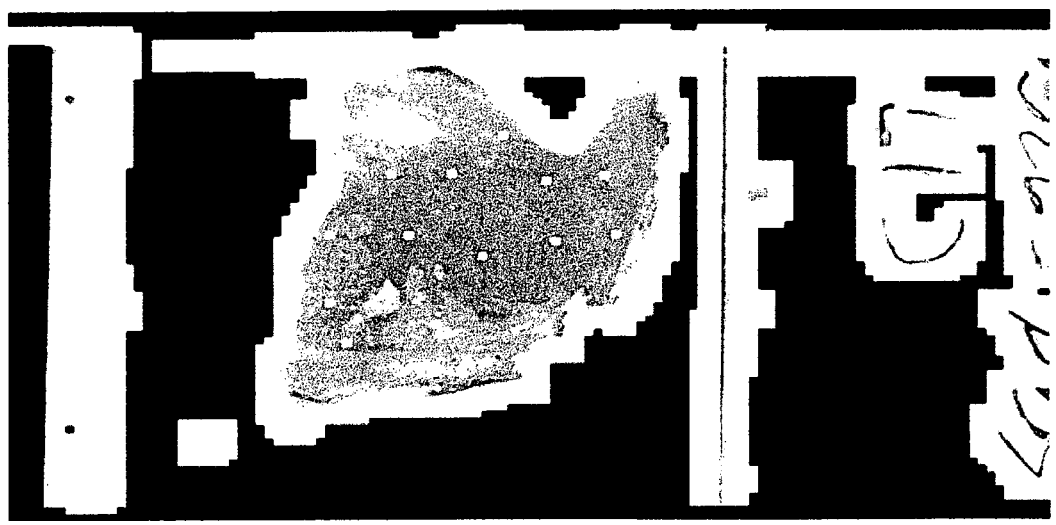
FIG. 4 is an overlay of FIGS. 2 and 3 representing the regions of the slide to be imaged.

An example of the image cropping and find tissue processing is shown in FIGS. 2, 3 and 4. FIG. 2 illustrates the macroscopic image after flat-field correction and image cropping. FIG. 3 illustrates the results of the find tissue component. The resulting tile matrix shown in FIG. 3 has a one-to-one correspondence to the field of view of the microscopic camera. White pixels (binary 1 ,) signify fields to be capture and black pixels represent regions not to image. FIG. 4 illustrates an overlay FIG. 2 and 3 representing the sections of the slide to be imaged. For this application (anatomical pathology), it is imperative to image all suspect regions that may contain tissue, so conservative criteria were used in the find tissue component, resulting in cover slip edges and writing etched into the slide to be identified as to be imaged. The savings in the acquisition time is representative by the ratio of the white to black areas of FIG. 3. For this image, only 53% of the slide region is to be imaged, including the label and cover slip edges, and etched writing on the slide.

At the completion of the find tissue component, the scan control component interprets the find tissue tile matrix (FIG. 3) and transposes the positions into actual stage coordinates for the microscopic imaging. A program running on a host computer controls the operation by communicating with a stage controller and microscopic camera 104. Actual scanning can occur in any fashion such as by rows or columns, or in a step fashion to image neighboring areas.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An imaging apparatus, comprising:
    a macro camera to capture a low-resolution digital image of a slide;
    a system to identity a region of interest from the low-resolution digital image and to provide an indication of which regions should be imaged; and
    a microscopic camera to capture a high-resolution image of the region of interest;
    wherein identifying a region of interest includes differentiating the region of interest from a region not of interest based, at least in part, on the typical-location of tissue and non-tissue.

2. The imaging apparatus of claim 1, wherein the macro camera is to capture at least two low-resolution digital images of the slide.

3. The imaging apparatus of claim 1, wherein the system is to automatically identify the region of interest from the low-resolution digital image.

4. The imaging apparatus of claim 1, wherein the system includes software executed by a computer.

5. The imaging apparatus of claim 1, wherein the region of interest is a region containing tissue.

6. The imaging apparatus of claim 1, wherein the microscopic camera is to capture a high-resolution image of at least two tissue containing regions.

7. The imaging apparatus of claim 1, wherein identifying a region of interest includes differentiating the region of interest from a region not of interest based, at least in part, on the typical appearance of tissue and non-tissue.

8. The imaging apparatus of claim 1, wherein providing an indication of which regions should be imaged includes providing a tiling matrix.

9. The imaging apparatus of claim 8, the system is further to transpose the tiling matrix into coordinates of the high-resolution image to be captured.

10. An imaging apparatus, comprising:
    a motorized stage having a slide holder;
    a macro camera directed toward the slide holder to capture a low resolution digital image of a slide placed on the slide holder;
    a system to identify a region of interest from the low-resolution digital image; and
    a microscopic camera directed toward the slide holder through a microscopic optic to capture a high-resolution image of the region of interest;
    wherein identifying a region of interest includes differentiating the region of interest from a region not of interest based, at least in part, on the typical location of tissue and non-tissue.

11. The imaging apparatus of claim 10, wherein the system is to automatically identify the region of interest from the low-resolution digital image.

12. An imaging apparatus, comprising:
    a camera directed toward a slide holder; and
    a computer to direct the camera to capture a low-resolution digital image of a slide present on the slide holder, to identify at least two non-contiguous regions of interest from the low-resolution digital image, to provide an indication of which regions should be imaged, and to direct the camera to capture high-resolution images of the at least two non-contiguous regions of interest;
    wherein identifying at least two non-contiguous regions of interest includes differentiating regions of interest from regions not of interest based, at least in part, on the typical location of tissue and non-tissue.

13. The imaging apparatus of claim 12, wherein the camera is to capture at least two low-resolution digital images of the slide.

14. The imaging apparatus of claim 12, wherein the computer is to automatically identify the at least two regions of interest from the low-resolution digital image.

15. The imaging apparatus of claim 12, wherein the at least two regions of interest are tissue containing regions of the slide.

16. The imaging apparatus of claim 12, wherein identifying at least two non-contiguous regions of interest includes differentiating regions of interest from regions not of interest based, at least in part, on the typical appearance of tissue and non-tissue.

17. The imaging apparatus of claim 12, wherein providing an indication of which regions should be imaged includes providing a tiling matrix.

18. The imaging apparatus of claim 17, wherein the computer is further to transpose the tiling matrix into coordinates of the high-resolution image to be captured.

19. An imaging method, comprising
capturing a low-resolution digital image of a slide;
identifying a region of interest from the low-resolution digital image by using a computer system;
providing an indication of which regions should be imaged; and
capturing a high-resolution image of the region of interest;
wherein identifying a region of interest includes differentiating the region of interest from a region not of interest based, at least in part, on the typical location of tissue and non-tissue.

20. The imaging method of claim 19, further comprising capturing at least two low-resolution digital images of the slide.

21. The imaging method of claim 19, wherein identifying the region of interest from the low-resolution digital image is performed automatically by a computer.

22. The imaging method of claim 19, wherein the region of interest is a region containing tissue.

23. The imaging method of claim 19, further comprising capturing high resolution images of at least two tissue containing regions.

24. The imaging method of claim 19, wherein identifying a region of interest includes differentiating the region of interest from a region not of interest based, at least in part, on the typical appearance of tissue and non-tissue.

25. The imaging method of claim 19, wherein providing an indication of which regions should be imaged includes providing a tiling matrix.

26. The imaging method of claim 25, further comprising transposing the tiling matrix into coordinates of the high-resolution image to be captured.

27. An imaging method, comprising:
capturing a low-resolution digital image of a slide;
identifying at least two non-contiguous regions of interest from the low-resolution digital image by using a computer system;
providing an indication of which regions should be imaged; and
capturing high-resolution images of the at least two non-contiguous regions of interest;
wherein identifying at least two noncontiguous regions of interest includes differentiating regions of interest from regions not of interest based, at least in part, on the typical location of tissue and non-tissue.

28. The imaging method of claim 27, further comprising capturing at least two low-resolution digital images of the slide.

29. The imaging method of claim 27, wherein identifying the at least two regions of interest from the low-resolution digital image is performed automatically by a computer.

30. The imaging method of claim 27, wherein the at least two regions of interest are tissue containing regions of the slide.

31. The imaging method of claim 27, wherein identifying at least two noncontiguous regions of interest includes differentiating regions of interest from regions not of interest based, at least in part, on the typical appearance of tissue and non-tissue.

32. The imaging method of claim 27, wherein providing an indication of which regions should be imaged includes providing a tiling matrix.

33. The imaging method of claim 32, further comprising transposing the tiling matrix into coordinates of the high-resolution image to be captured.

* * * * *